(12) United States Patent
Ebro et al.

(10) Patent No.: US 7,346,899 B2
(45) Date of Patent: Mar. 18, 2008

(54) LOOKUP FACILITY IN DISTRIBUTED COMPUTER SYSTEMS

(75) Inventors: Christophe Ebro, Villard Bonnot (FR); Vincent Perrot, Sainte Agnes (FR); Daniel Lutoff, Saint Martin d'Heres (FR)

(73) Assignee: Sun Microsystems, Inc., Santa Clara, CA (US)

( * ) Notice: Subject to any disclaimer, the term of this patent is extended or adjusted under 35 U.S.C. 154(b) by 765 days.

(21) Appl. No.: 10/700,101

(22) Filed: Nov. 3, 2003

(65) Prior Publication Data

US 2004/0168169 A1     Aug. 26, 2004

(51) Int. Cl.
  *G06F 9/45*     (2006.01)
(52) U.S. Cl. ...................... 717/144; 717/114
(58) Field of Classification Search ................ 717/143, 717/144, 114
See application file for complete search history.

(56) References Cited

U.S. PATENT DOCUMENTS

| | | | | |
|---|---|---|---|---|
| 6,397,232 | B1 * | 5/2002 | Cheng-Hung et al. | 715/523 |
| 6,810,429 | B1 * | 10/2004 | Walsh et al. | 709/246 |
| 6,817,008 | B2 * | 11/2004 | Ledford et al. | 717/102 |
| 7,065,561 | B2 * | 6/2006 | Fry et al. | 709/219 |
| 7,133,862 | B2 * | 11/2006 | Hubert et al. | 707/3 |
| 7,158,990 | B1 * | 1/2007 | Guo et al. | 707/102 |
| 7,278,132 | B2 * | 10/2007 | Pelegri-Llopart et al. | 717/115 |

FOREIGN PATENT DOCUMENTS

WO    WO 02/091171    11/2002

OTHER PUBLICATIONS

XSLT Working with XML and HTML, Khun Yee Fung, Dec. 28, 2000, Chapters 1-4, 6-7, 12 and 13.*
A Coversion Tool from DTD to XML Schema, W3C.org, Jan. 11, 2001, 4 pages.*
XML: A Query Language for XML Data W3C.org, Hiroshi Ishikawa et al, 1998, 5 pages.*
LDAP Programming with JAVA, Rob Weltman et al, 2000, pp. 49-163, 243-340, 377-421.*
PCT Search Report, PCT/IB 02/01376, filing date Apr. 25, 2002.
James X. Ci, et al. "Distributed Component Hub for Reusable Software Components Management" . (c) 2000 IEEE, pp. 429-435.
Using Weblogic JNDI, XP-002262141, retrieved on the internet on Nov. 19, 2003; retrieved at http://www.weblogic.com/docs51//classdocs.APIindi.html. pp. 1-14.

(Continued)

*Primary Examiner*—Todd Ingberg
(74) *Attorney, Agent, or Firm*—Darby & Darby P.C.; M. David Ream

(57) ABSTRACT

In an embodiment of the present invention, at a Deployer level, an application software component is provided with a tree representation 510 of objects it contains. An object is a leaf node, with the attributes of the object being in nexus between the root and the leaf node. An accessor object 511 has methods to access the tree 510. In one embodiment of the present invention, at an administrator level, a handler object 611 in turn accesses accessor object 511. Handler object 611 may be part of a handler home object 619. Client applications 710 have lookup services 711 to access handler objects like 611, e.g. via a lookup home object 719, and handler home object 619.

23 Claims, 8 Drawing Sheets

OTHER PUBLICATIONS

Todd Sundsted; JNDI overview, Part 2: An introduction to directory services, XP-002262140, retrieved on the internet on Jul. 10, 2003; retrieved from the internet at http://www.javaworld.com/javaworld/jw-02-2000/jw-02-howto_p.html. pp. 1-6.

Sameer Tyagi; LDAP and JNDI: Together forever; Learn how LDAP and JNDI combine to form a powerful directory and Java oject storage facility; XP-002263139, retrieved on the internet on Jun. 10, 2003; retrieved from the internet at http://www.javaworld.com/javaworld/jw-03-2000/jw-0324-idap.html. pp. 1-19.

Sun Microsystems, Inc., Java Naming and Director Interface™ Application Programming Interface (JNDI API); XP-002145962; JNDI 1.2/Java™ 2 Platform, Standard Edition, v. 1.3; Jul. 14, 1999. 76 Pages.

* cited by examiner

US 7,346,899 B2

LOOKUP FACILITY IN DISTRIBUTED COMPUTER SYSTEMS

RELATED APPLICATION

This application is related to and claims priority of French patent application, serial no. 01/05920, filed May 3, 2001, which was filed under the Patent Cooperation Treaty on Apr. 25, 2002, assigned application number PCT/IB02/01376, published Nov. 14, 2002, as Publication Number WO 02/091171 A2, each of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

FIELD OF INVENTION

This invention relates to distributed computer systems.

BACKGROUND OF INVENTION

In certain fields of technology, e.g. telecommunications, a complete system may include a variety of equipments from various types and manufacturers. This is true not only at the hardware level, but also at the software level.

System Management and other purposes make it desirable that equipments in a system ("client components") can access a number of properties of other equipments ("application software components"). It is further desirable that this be made possible substantially without human intervention at runtime, and with minimal human intervention before runtime.

SUMMARY OF THE INVENTION

A general aim of the present invention is to provide advances in these directions. In an embodiment of the present invention, this invention offers a method of aiding deployment in a distributed computer system, using application software components, including:

a. providing a tree representation of objects existing in at least some of the application software components, the tree representation including an object as a leaf node, with the attributes of the object being in nexus between the root and the leaf node, and b. providing an accessor object, comprising accessor methods to the tree representation, said accessor methods having predefined names and functions.

In one embodiment of the invention, an apparatus and/or software code for implementing the method is disclosed, in all its alternative embodiments to be described hereinafter.

BRIEF DESCRIPTION OF THE DRAWINGS

The present invention may be better understood and its numerous objects, features, and advantages made apparent to those skilled in the art by reference to the accompanying drawings in which.

DETAILED DESCRIPTION

Figure 1:
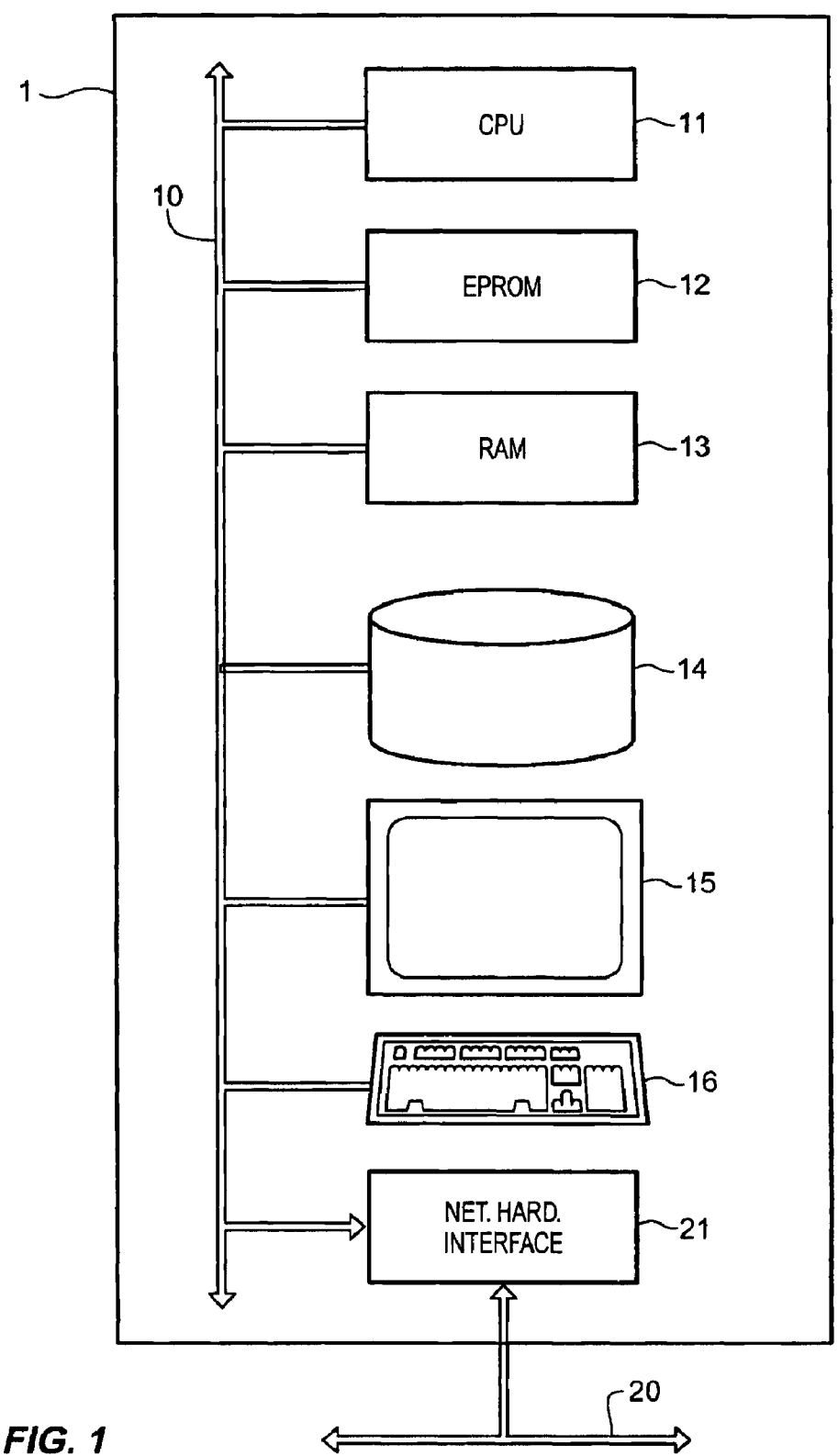
FIG. 1 is a general diagram of a computer system in which an embodiment of the invention is applicable.

As cited in this specification, Sun, Sun Microsystems, Solaris, Java, EmbeddedJava, PersonalJava, JavaBeans, Java Naming and Directory Interface, JDBC, Enterprise JavaBeans (EJB), Jini, Sun Spontaneous Management, Java 2 Enterprise Edition (J2EE), JavaServer Pages (JSP) are trademarks of Sun Microsystems, Inc. SPARC is a trademark of SPARC International, Inc.

Additionally, the detailed description is supplemented with Exhibits. Acronyms used in this specification include:
3GPP: 3rd Generation Partnership Project
DD: Deployment Descriptor (a feature of EJBs)
DN: Distinguished Name
EJB: Enterprise JavaBeans.
HTML: HyperText Markup Language
ISV: Independent Software Vendor
J2EE: Java 2 Enterprise Edition.
J2SE: Java 2 Standard Edition.
JDBC: Java DataBase Connectivity
JNDI: Java Naming and Directory Interface.
JSP: Java Server Pages
JSR: Java Specification Request
LDAP: Lightweight Directory Access Protocol.
OSS/J: Operating Support System through Java
RDN: Relative Distinguished Name
RMI: Remote Method Invocation (a Java feature)
UI: User Interface
URL: Uniform Resource Locator
XML: eXtensible Markup Language
Expressions used in this specification include:

| | |
|---|---|
| E2-1 | root=MyRoot, apiType=TroubleTicket, vendor=Vendor1, product=Product1, version=v1.0, name = TTSystemHome |
| E2-2 | root=MyRoot/ apiType=TroubleTicket/ vendor=Vendor1/product=Product1/ version=v1.0/ TTSystemHome |

-continued

| | |
|---|---|
| E2-3 | root=MyRoot/ neType=myNe/name=TTSystemHome |
| E2-4 | /vendor=Vendor1/ product=Product1/ version=v1.0/ TTSystemHome |
| E2-5 | root=MyRoot, apiType=TroubleTicket, vendor=Vendor1, name=EvtTopic. |
| E2-6 | root=MyRoot/ apiType=TroubleTicket/ vendor=Vendor1/EvtTopic. |
| E2-7 | /vendor=Vendor1/EvtTopic. |
| E2-8 | |
| <apiType> | N1 |
| <vendor> | N11 |
| <product> | N111 |
| <Topic> | N112 |
| <version> | N1111 |
| <HomeInterface> | N11111 |
| <neType> | N2 |
| <HomeInterface> | N21 |
| E2-9 | |
| TroubleTicket | N1 |
| Vendor1 | N11 |
| Product1 | N111 |
| EvtTopic | N112 |
| v1.0 | N1111 |
| TTSystemHome | N11111 |
| MyNE | N2 |
| TTSystemHome | N21 |

Objects and attributes used in this specification include:

E3-1 - Deployer objects

| | |
|---|---|
| accessor: | object |
| JndiProviderAccessor: | An interface for the accessor object The JndiProviderAccessor interface provides the following methods: |
| M1 | *A method to return the domain name (set by the provider when creating the object) |
| M2 | *A method to retrieve the names of attributes supported for searching |
| M3 | *A method to retrieve the values existing in the tree for a given attribute |
| M4 | *A method to retrieve an object using its full JNDI name |
| M5 | *A method to retrieve one or more objects using one or more attribute values |
| JndiProviderAccessorImpl | an implementation of the JndiProviderAccessor interface |

E3-2 - Administrator (server) objects

JndiProviderHandlerBean
JndiProviderHandlerHome, having methods:
    create0(URL)
    create1(<whole JNDI environment>)

E3-3 - Client objects

| | |
|---|---|
| LookupBean | |
| LookupHome: | interface |
| LookupResult | class for results of lookup |
| LookupResultImpl | an implementation of the LookupResult class |

Portions of code include:

E4-1

```
// Creation of a default WLS Environment to have default settings
Environment env = new Environment( );
// Retrieves JNDI environment
Hashtable envTable = env.getProperties( );
```

-continued

```
// Initialise the accessor, that will create internal caches
JndiProviderAccessor accessor = new
JndiProviderAccessorImpl(envTable);
// Bind the accessor
Context ctxt = env.getInitialContext( );
ctxt.bind(<< accessor >>, accessor);
```

E4-2

```
// Retrieve the Home interface from JNDI
// This code is executed in the app server where
the application is, so where its LJP is
Context ctxt = new InitialContext( );
JndiProviderHandlerHome hdlerHome = ...;
// Creates an Entity Bean for the Prod1 DAJP
Hashtable envTable = new Hashtable(1);
envTable.put(Context.APPLET, ...);
JndiProviderHandler hdler = hdlerHome.create(envTable);
// When created, the EJB will try to create a context using the
given environment into the
// DAJP.
// As this environment includes a reference to an applet,
this applet will be invoked to get
// the other environment properties
```

E4-3

```
// Retrieve the Home interface in the local LJP
Context ctxt = new InitialContext( );
LookupHome lkupHome = ...;
// Retrieve a Session Bean to perform the lookups
Lookup lkup = lkupHome.create( );
// Perform a lookup
Attributes atts = new BasicAttributes( );
Attribute att1 = atts.put(Lookup.PRODUCT_NAME, "Prod1");
NamingEnumeration result = lkup.listTopics("Vendor1Domain", atts);
while (result.hasMore( )) {
    LookupResult currRes = (LookupResult)(result.next( ));
    // Can be downcasted without narrowing,
    narrowing done when creating the
    // LookupResult object
    Topic currTopic = (Topic)(currRes.getObject( ));
    ...
}
```

In the foregoing description, references to the Exhibits are made directly by the Exhibit or Exhibit section identifier: for example, E3-1 refers to section E3-1 in Exhibit E3. The Exhibits are placed apart for the purpose of clarifying the detailed description, and of enabling easier reference. They nevertheless form an integral part of the description of the present invention. This applies to the drawings as well.

Now, making reference to software entities imposes certain conventions in notation. For example, in the detailed description, Italics (or the quote sign ") may be used when deemed necessary for clarity.

However, in code examples:
    quote signs are used only when required in accordance with the rules of writing code, i.e. for string values.
    an expression framed with square brackets, e.g. [,property=value]* is optional and may be repeated if followed by *;
    a name followed with [ ] indicates an array.

Also, <attribute> may be used to designate a value for the attribute named "attribute" (or attribute).

In one embodiment, a computer system, or in a network comprising computer systems may be utilized. The hardware of such a computer system is for example as shown in FIG. 1, where:

11 is a processor, e.g. an Ultra-Sparc;
    12 is a program memory, e.g. an EPROM for BIOS, a RAM, or Flash memory, or any other suitable type of memory;

13 is a working memory, e.g. a RAM of any suitable technology (SDRAM for example);

14 is a mass memory, e.g. one or more hard disks;

15 is a display, e.g. a monitor;

16 is a user input device, e.g. a keyboard and/or mouse; and 21 is a network interface device connected to a communication medium 20, itself in communication with other computers. Network interface device 21 may be an Ethernet device, a serial line device, or an ATM device, inter alia. Medium 20 may be based on wire cables, fiber optics, or radio-communications, for example.

Data may be exchanged between the components of FIG. 1 through a bus system 10, schematically shown as a single bus for simplification of the drawing. As is known, bus systems may often include a processor bus, e.g. of the PCI type, connected via appropriate bridges to e.g. an ISA bus and/or an SCSI bus.

Figure 2:
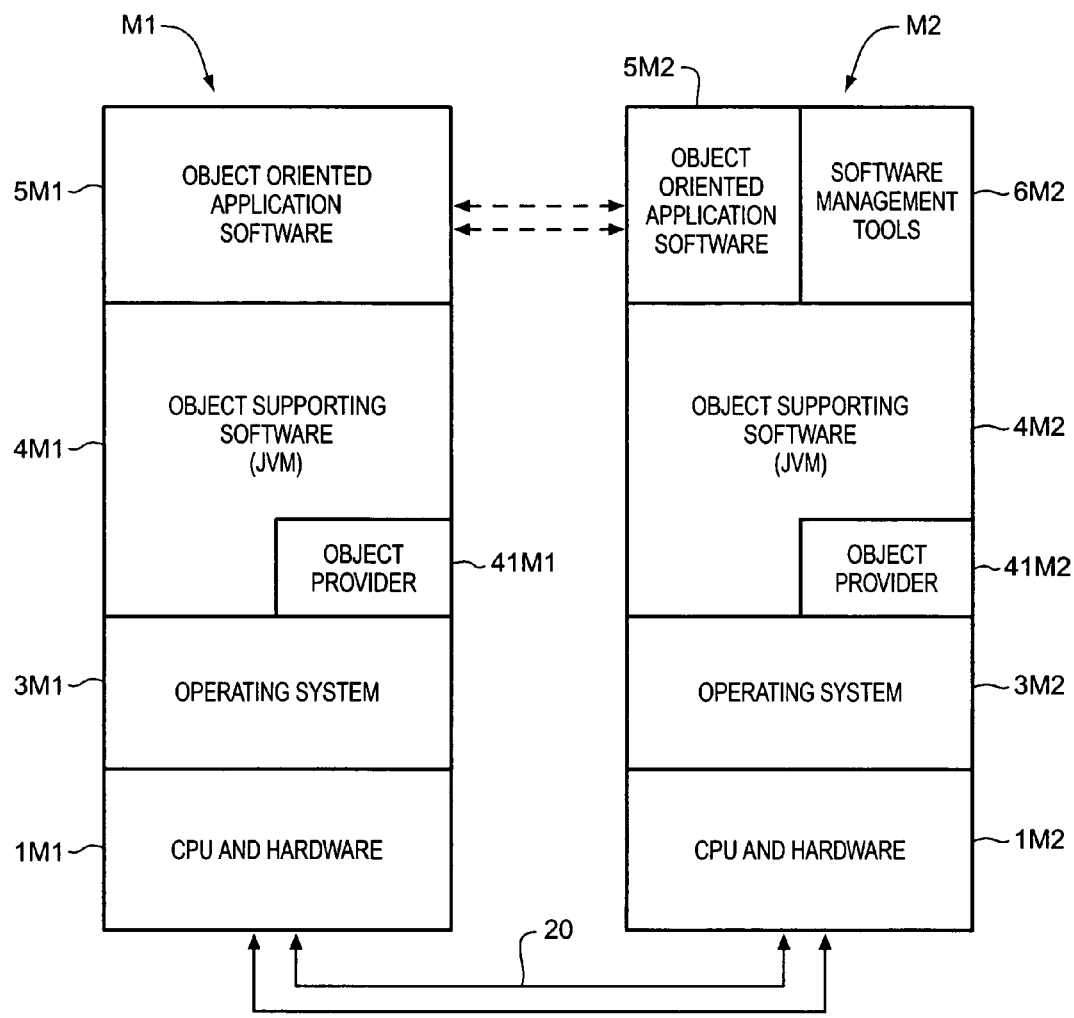
FIG. 2 is a general diagram of an object-oriented software environment in a distributed computer system.

FIG. 2 shows a simple example of a distributed environment, in the example of two machines M1 and M2, interconnected by a link 20, e.g. a network medium. The invention may also apply within a single machine. The machines may have the exemplary structure of FIG. 1, or any silmilar structure. In FIG. 2, the CPU and hardware of FIG. 1 is diagrammatically shown as 1M1 and 1M2. In the drawing, the blocks showing the same functions are identified by the same reference number, immediately followed by the machine identifier, which may be omitted in this description. Each computer system also has an operating system 3, e.g. Solaris. Operating systems other than Solaris may be used in accordance with the invention. An object supporting software 4 may be installed over operating system 3.

The object supporting software 4 may e.g. include the necessary software to build a Java virtual machine or JVM. It includes an object processor or object provider 41, e.g. the ClassLoader class of the Java language. Object supporting software other than a JVM may be used in accordance with the invention. The object supporting software 4 may then serve to run object oriented application software 5. When required, changes in object oriented application software 5 may be made using software management tools 6. The software management tools may be designed in accordance with the JMX specification. However, the invention may apply to other software management tools as well.

As shown, an exemplary architecture may include the object oriented application software 5M1 in machine M1, and the software management tools 6M2 in machine M2, which thus may be dedicated to software management. However, many other combinations are possible, based on two machines or more. Provision for a management dedicated machine is an option. One or more machines may include both application software and management tools, as shown in FIG. 2. Also, each machine may support one or more Java virtual machines or other types of machines or devices.

Details regarding to Java and/or J2EE may be found at: http://Java.sun.com/J2EE and/or in the corresponding printed documentation, e.g. "The Java Language Specification", J. GOSLING, Bill Joy, Guy STEELE, Addison Wesley, 1996, ISBN 0-201-63451-1.

Generally, in object oriented programming, an object may comprise properties (or "fields") and methods, together termed [objects] members. For convenience, the methods are usually identified by their name followed with ( ). Where a method requires parameters, these are inserted between the two round brackets. Most of the methods are directed to the members or internal contents of the object: get( ) for reading a property, set( ) for writing a property, other property-related methods, access to other methods, etc. . .

A method contained in an object may be inter alia public or private; this determines whether it is accessible (may be invoked) from outside the object, or not.

Object oriented programming also uses "classes", which may serve the following purposes:

objects may be "instantiated" from a class, using an object constructor (in short, a constructor); in Java, a constructor is a method having the same name as the class it belongs to.

a class may "extend" a parent class, thus inheriting the properties and methods of the parent class.

A language like Java also supports a special type of entity, named "interface". Interfaces may be viewed as a special form of classes, which may support multiple inheritance. Interfaces may basically contain abstract methods. The word "interface" is used herein to refer to such entities. It covers any similar entities which may be developed in a language other than Java. A class may "implement" an interface. This means that the class concretely defines the methods existing in the interface.

Languages like Java may also include naming services, like, in Java 2 Platform Standard Edition, the packages: javax.naming, javax.naming.directory, and javax.naming.ldap.

Figure 3:
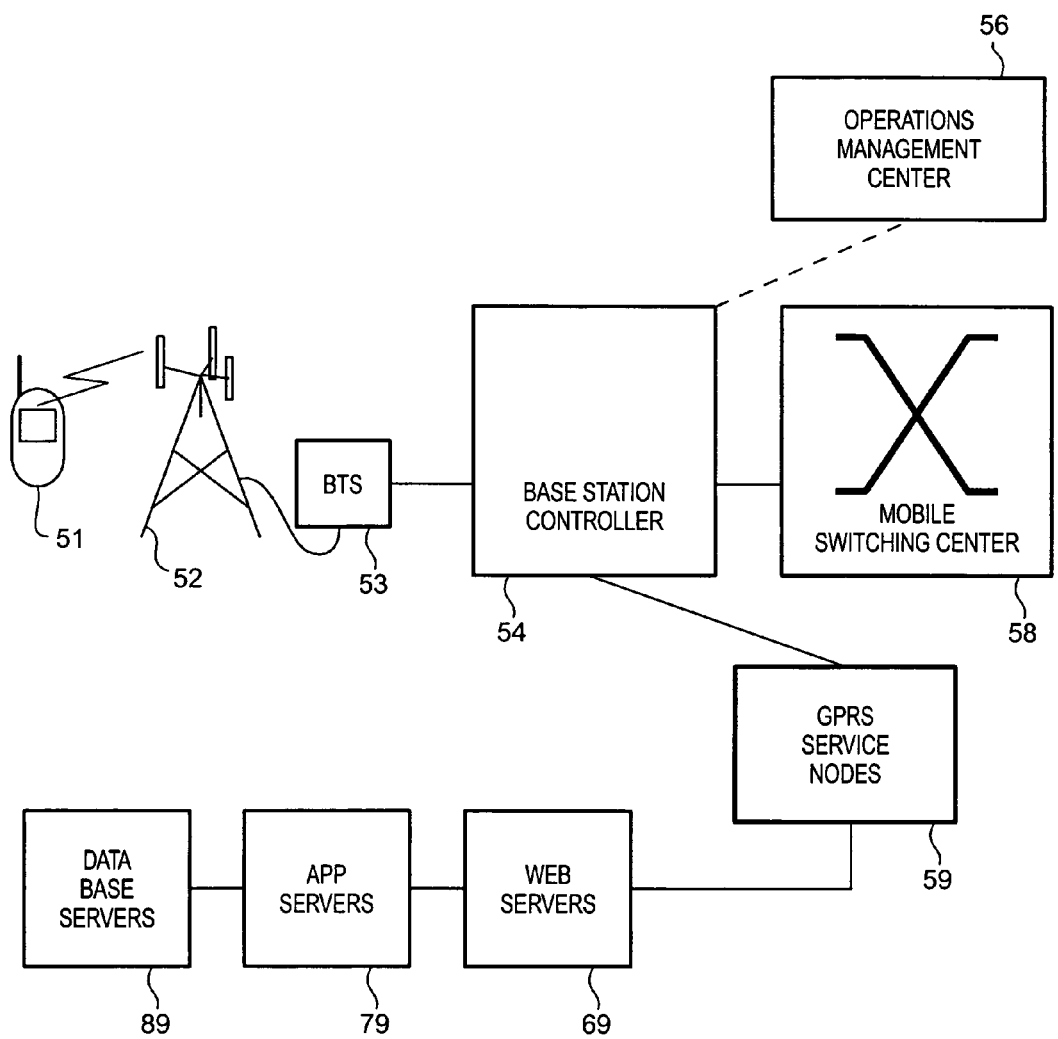
FIG. 3 is a general diagram of a telecommunication network system in which an embodiment of the invention may be applicable.

FIG. 3 illustrates an exemplary simplified telecommunication network system. Terminal devices (TD) like 51 are in charge of transmitting data, e.g. connection request data, to base transmission stations (BTS) like 53, e.g. via antennas 52. A such base transmission station 53 gives access to a communication network, under control of a base station controller 54. The base station controller 54 comprises communication nodes, supporting communication services ("applications"). Base station controller 54 also uses a mobile switching center 58 (MSC), adapted to orientate data to a desired communication service (or node), and further service nodes 59 (e.g. GPRS), giving access to network services, e.g. Web servers 69, application servers 79, data base server 89. Base station controller 54 is managed by an operation management center 56 (OMC).

Referring to FIG. 3, a BSC 4 may for example need to know its surrounding Base stations or BTS 3, so as to optimize its connections with them. The entity needing information is hereinafter called "client". Usually, it is a software entity.

The system of FIG. 3 is an exemplary system in which the invention may apply. However, it may also apply in a number of other distributed and/or networked systems as well. This description will refer to a "platform" which comprises hardware and software. In network applications, e.g. in the telecom industry, it is desirable to have a unique identifier for representing each platform item. It is also desirable that searching criteria be applicable to the platform items, using "attributes" of that platform, like e.g.: network, computer, board.

Systems like the one of FIG. 3 may make use of a management oriented platform. An exemplary such platform is Java 2 Enterprise Edition (J2EE), a detailed description of which may be found e.g. at http://java.sun.com/j2ee/blueprints/platform technologies/index.html and in the corresponding written documentation. The main features of J2EE will now be briefly recalled.

All J2EE components depend on the runtime support of a system-level entity called a container. Containers provide components with services such as life cycle management, security, transaction, and threading. Because containers manage these services, many component behaviors can be declaratively customized when the component is deployed in the container. For example, an Application Component Provider can specify an abstract name for a database that an Enterprise JavaBeans component needs to access and a Deployer will link that name with the information (such as a user name and password) needed to access the database in a given environment.

Figure 4:
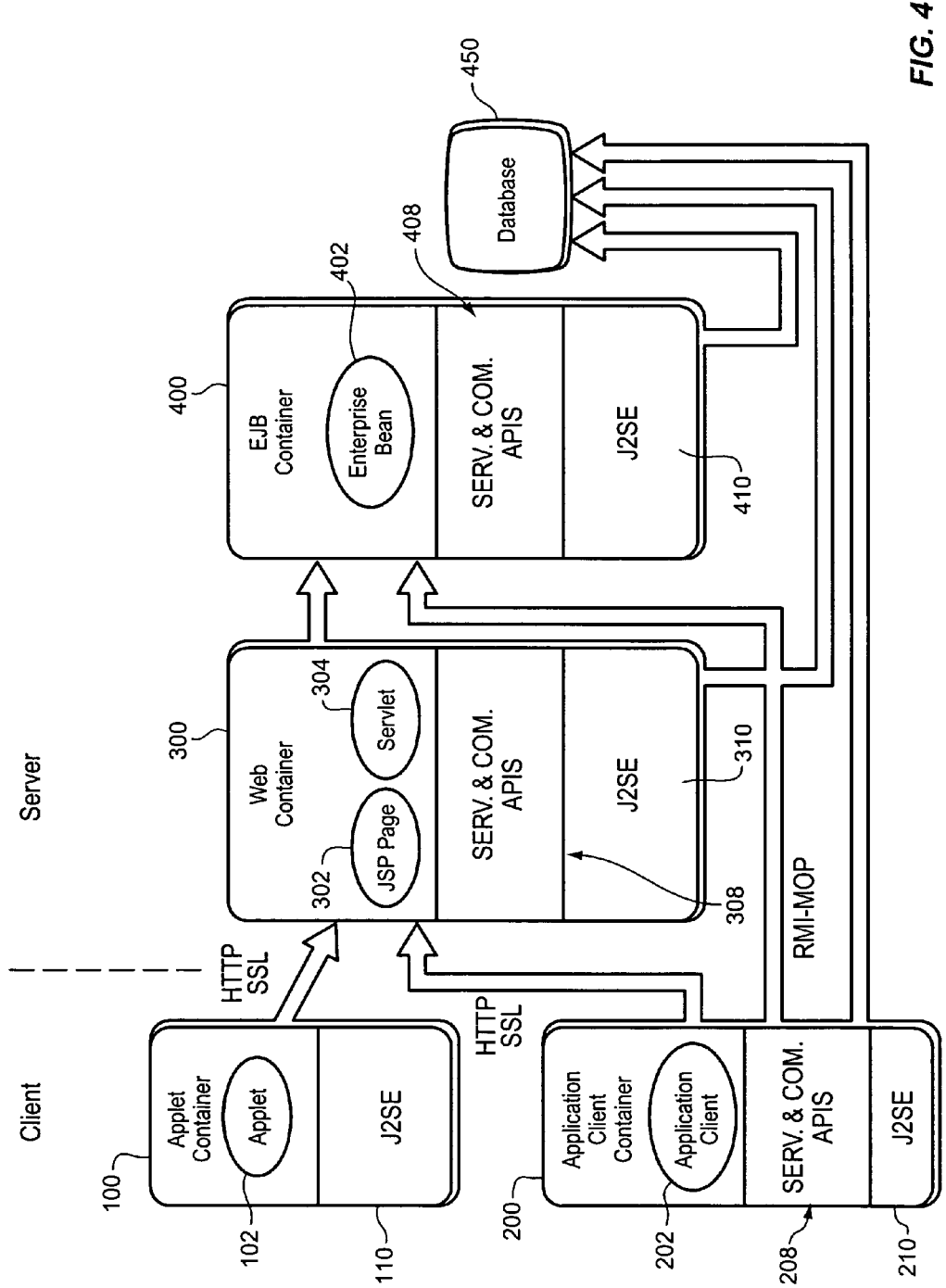
FIG. 4 is a general diagram of an exemplary management oriented platform in accordance with an embodiment of the present invention.

Now referring to FIG. 4, in J2EE, an application-level software unit is termed a "component". In addition to JavaBeans components, which are part of the J2SE platform, the J2EE platform currently supports the following types of components:

running on a client platform, in the own Java virtual machine of the client:
applets 102, in applet container 100, together with J2SE functionalities 110; and
application clients 202, in application client container 200, together with J2SE functionalities 210, underlying service and communication APIs 208;
running on a server platform:
Web components, like JSP pages 302 and servlets 304, stored e.g. in web container 300 (or in separate containers), together with J2SE functionalities 310, underlying service and communication APIs 308, which include support for JNDI, e.g. JNDI 1.2; and
Enterprise Bean components like 402, stored e.g. in container 400, together with J2SE functionalities 410, underlying service and communication APIs 408.
as an example of server data, a database 450.

In J2EE, the enterprise beans are termed Enterprise JavaBeans (EJB). They form a server-side technology architecture for developing and deploying components containing the business logic of an enterprise application. Enterprise JavaBeans components are scalable, transactional, and multi-user secure.

Now, EJB container 400 contains enterprise beans like 402. EJB container 400 has the standard container services, plus a range of transaction and persistence services and access to service and communication APIs 408, over a J2SE layer 410. Service and communication APIs 408 (and also 308) include support for JNDI, e.g. JNDI 1.2.

There are two types of enterprise beans, session beans and entity beans:

A session bean is created to provide some service on behalf of a client and usually exists only for the duration of a single client-server session. A session bean performs operations such as calculations or accessing a database for the client. While a session bean may be transactional, it is not recoverable should its container crash. Session beans can be stateless or can maintain conversational state across methods and transactions. If they do maintain state, the EJB container manages this state if the object must be removed from memory. However, the session bean object itself must manage its own persistent data.

an entity bean is a persistent object that represents data maintained in a data store; its focus is data-centric. An entity bean can manage its own persistence or it can delegate this function to its container. An entity bean can live as long as the data it represents. An entity bean is identified by a primary key. If the container in which an entity bean is hosted crashes, the entity bean, its primary key, and any remote references survive the crash.

To sum up, FIG. 4 illustrates a typical structure using the J2EE component types and their containers, by way of example. Containers provide all application components with the J2SE platform APIs, which may e.g. include the Java IDL and JDBC 2.0 core enterprise APIs. The JDBC API enables containers 300 and 400 to access database 450. RMI and/or IIOP API enable container 200 to access container 400 and/or database 450. HTTP and/or SSL services enable containers 100 and/or 200 to communicate with container 300.

J2EE also defines the roles of the human actors as follows:
a component developer or provider will supply a software component;
an assembler will gather components to build a deployable application;
a deployer will provide the deployable application with the resources it needs in a given hardware and software environment.

In an embodiment of the present invention, the user entity will also have an administrator (who may be the same person as the deployer) to dynamically organize the deployable application, its networking features, and also its changes in the course of its lifetime.

A system like the one of FIG. 4 may be viewed as a distributed client-server system. The software constituents of such a system may come from various suppliers or ISV. Basically, each platform provider (or "deployer") would tend to use his own, proprietary, representation of the platform structure he proposes. Moreover, the structure of the representation may vary from one provider to another.

In such a system, a client may have to retrieve various software objects in the server. A client application should be able to get a unique identification of the individual items it needs in a given software constituent of another application in the system.

In an embodiment of the present invention, the expressions "interaction element(s)" or "interaction object(s)" refer to various distant software objects which exist in another part of the distributed system, and which a client application may need to identify. For example, in a J2EE system, this includes inter alia the following J2EE objects:
Home interfaces, e.g. to Session and/or Entity Beans (EJB),
Topics, to "subscribe" and "publish" events,
Queues, to send and receive asynchronous messages, and
connection "factories", to create connections.

Tree representations may be used to this effect, since they facilitate searching. JNDI is an example of a tree-based software interface, which may be used in a distributed client-server system. In fact, a JNDI tree is similar to the tree structure in a file system, however with a different terminology, shown in the following table:

| Tree node type | File system | JNDI |
| --- | --- | --- |
| Nexus | "directory" | "context" |
| Leaf | "file" | "object" |

In accordance with an embodiment of this invention, an object is a leaf node in a tree, while attributes associated to that object may be successive nexus between the root and the leaf node. This is termed a "leaf-object" tree hereinafter.

In the JNDI terminology, "binding" associates a JNDI name with an object. A JNDI Name is a set of ordered atomic names. "binding" is used here more broadly to associate a name (JNDI or other) with an object.

JNDI has several levels:
- a "basic" JNDI implementation, which provides classes and interfaces to access the naming service of JNDI only;
- a "directory" JNDI implementation, which offers possibilities of searching an object from various combinations of its attributes; and
- an LDAP implementation of JNDI, which additionally offers all LDAP services.

The information provided by a company X for its products may be arranged as a JNDI tree. Such information includes interaction objects, amongst other data which are of less or no interest for those (the software applications) who have to interact with the products, for example price, time of delivery.

Another embodiment of this invention resides in separately presenting the interaction objects themselves in the form of a leaf-object tree, i.e. like a JNDI tree: each interaction object is a leaf node in a tree, while attributes associated to that interaction object are successive nexus between the root and the leaf node. It should be noted that the succession of nexus creates a hierarchy between the attributes.

The expression "item list" is used here to designate the ordered list of node contents found when scanning the tree from the root to a leaf: thus, an item list contains an ordered succession of attributes of an interaction object, and terminates with the interaction object itself. An exemplary item list is shown at E2-1 in Exhibit 2.

It is now considered that all information concerning objects being useful in a given deployable application have been converted into the form of a global JNDI tree (i.e. a suitable computer readable representation of a JNDI tree). The root of the tree is named e.g. "MyRoot" for convenience.

Figure 5:
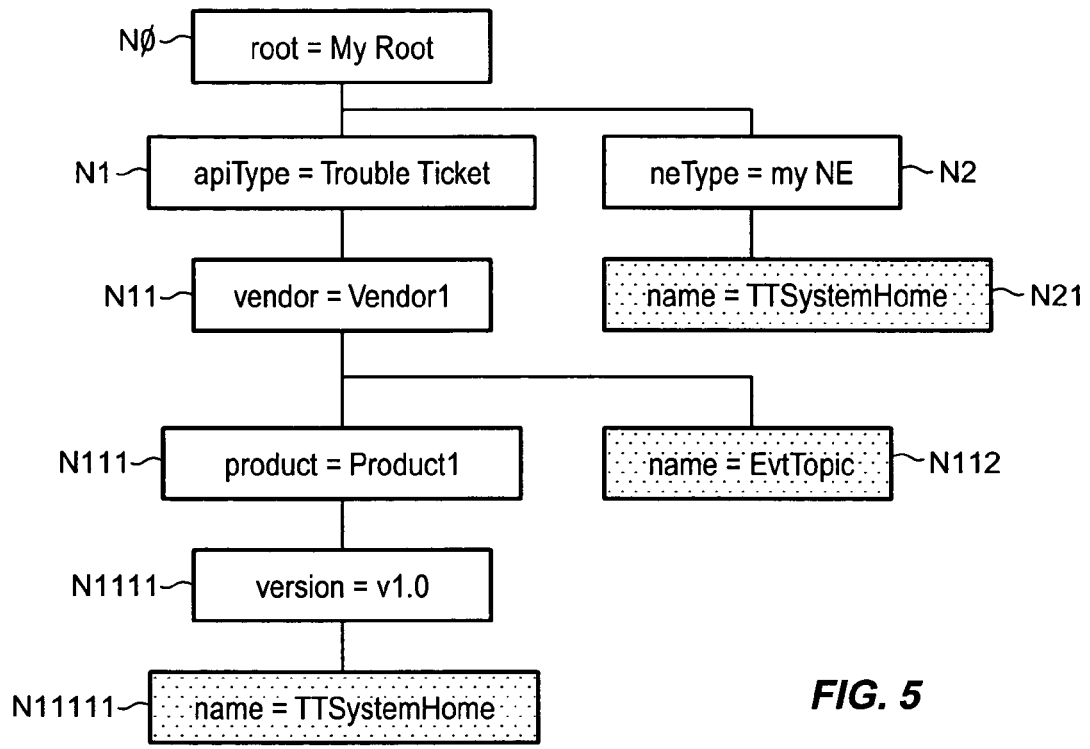
FIG. 5 illustrates an example of a tree structure in accordance with an embodiment of the present invention.
Figure 6:
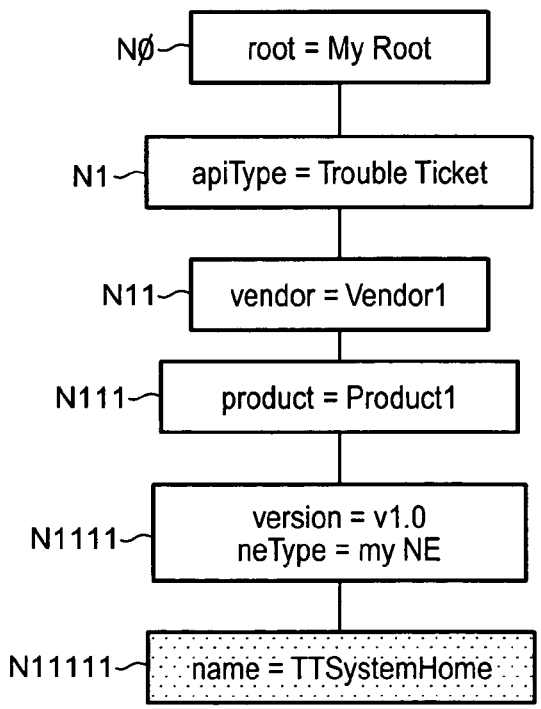
FIG. 6 illustrates an alternative example of a tree structure in accordance with an embodiment of the present invention.

In accordance with another embodiment of this invention, the tree has a form like the one shown in FIGS. 5 or 6, in a simplified version.

The nodes are identified in FIGS. 5 and 6 by using a unique node identification: "N" + a chain of digits (this particular notation is for illustration purposes). Since the node identifiers only define the node topology, the same identifiers will be used in other trees having a different node content. Also, a node identifier designates both the node itself and its connection with its parent node, except for the root.

FIG. 5 may be seen as a simple example of a JNDI tree, in which:
- the TTSystemHome object has been bound with a Name composed of atomic names, with values of the following attributes: "root", "apiType", "vendor", "product", "version","name",
- the TTSystemHome object has also been bound with a Name composed of atomic names, with values of the following attributes: "root", "neType", "name"
- the EvtTopic object has also been bound with a Name composed of atomic names, with values of the following attributes: "root", "apiType", "vendor", "name"

In the tree of FIG. 5:
- a complete path from the root of the tree to a leaf (e.g TtSystemHome) is uniquely defined by a "distinguished name" (DN) having the name+value format; in FIG. 5, each item contains a name+value pair; examples corresponding to the left path and upper right path in FIG. 5 are given at E2-2 and E2-3; for illustration purposes, the example at E2-3 uses the name+value notation for the leaf node as well.
- a path from an intermediate nexus to a leaf is uniquely defined by a "relative distinguished names" (RDN) having the name+value format; an example corresponding to a portion of the left path in FIG. 5 is given at E2-4.

Generally, when applying this to a JNDI embodiment of this invention, a JNDI context containing the object, or the object itself, will have a name composed of one or more Relative Distinguished Names (RDNs), with its complete JNDI name being a Distinguished Name (DN).

In an embodiment of the present invention, accesses to sub-trees of the above mentioned global tree may be provided. The sub-trees will be termed hereinafter "JNDI Provider" (this terminology is used for clarity, and does not intend to restrict application of this invention to JNDI). A JNDI Provider is uniquely identified in the distributed computer system by its URL (or another unique global addressing scheme, such as IP address, Ethernet address, etc.).

Figure 7:
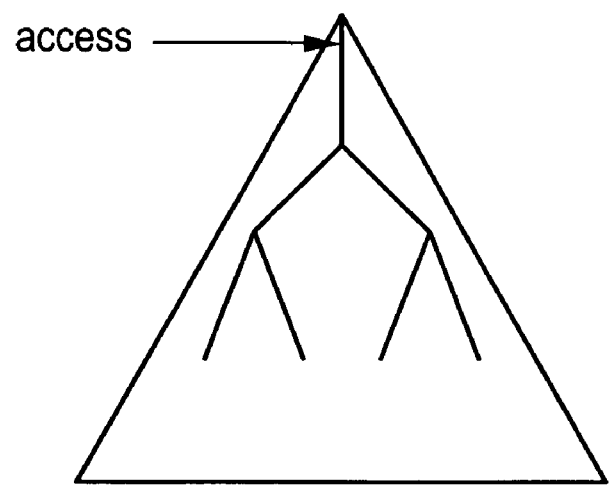
FIG. 7 illustrates a first way of accessing a tree in accordance with an embodiment of the present invention.
Figure 8:
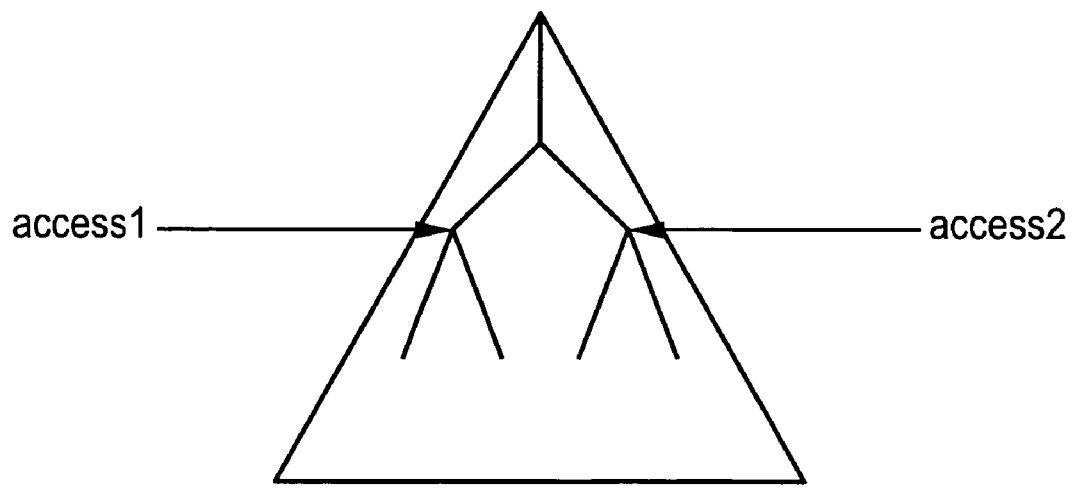
FIG. 8 illustrates other ways of accessing a tree in accordance with an embodiment of the present invention.

Reaching a JNDI provider may be done by accessing a JNDI server, which, in turn, accesses the JNDI provider, by creating a context at a given "level" in the global JNDI tree:
- as shown in FIG. 7, the access may be at the "root" context or "initial context" in the JNDI tree; if so, the "entire" JNDI tree is the JNDI provider (this is specified by the environment provided when creating the Context to access the tree);
- as shown in FIG. 8, several JNDI providers may be based on the same JNDI tree, while being "physically" represented by different intermediate contexts, e.g. access1, access2, accessing sub-trees of the global JNDI tree being considered ; note that access1 and access2 are "initial contexts" for the JNDI providers they build.

In this description:
- a Deployed Application JNDI Provider or DAJP will designate a JNDI provider as used to provide interaction objects, allowing to interface with a given specific application, such as EJB Home interfaces, Topics, Queues and Connection Factories, for example. (The acronym DAJP is used here for clarity only, and does not intend to restrict application of this invention to JNDI).
- a Lookup JNDI provider or LJP is a JNDI provider that refers to one or more Deployed Application JNDI Providers or DAJPs.

Figure 9:
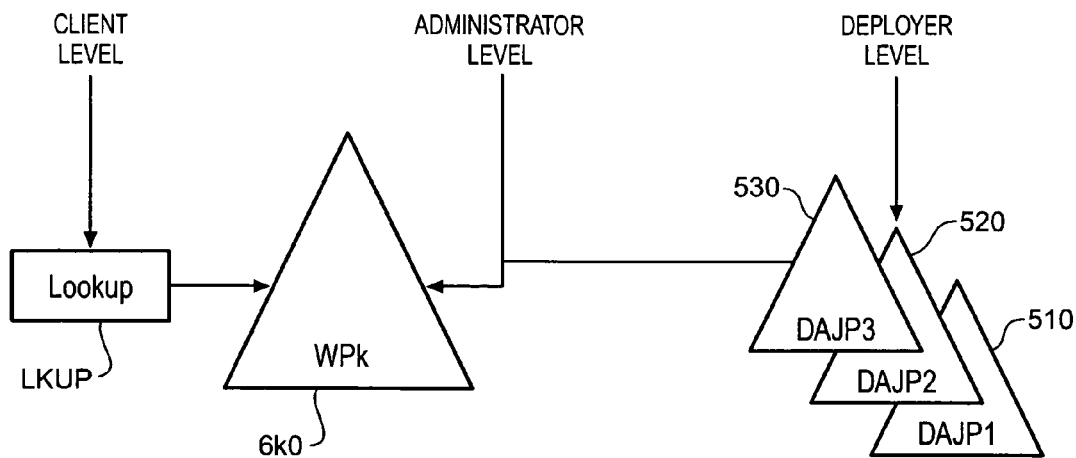
FIG. 9 illustrates an exemplary system in accordance with an embodiment of the present invention.

Reference will now be made to FIG. 9, which shows a simplified exemplary embodiment of this invention. Like certain other figures, it includes triangular blocks, instead of rectangular ones, to reflect the fact that a tree structure may be used, at least implicitly.

FIG. 9 generally illustrates three different types of functionalities:
1. At a Deployer level, one or more Deployed Application JNDI Provider(s) (DAJP), labeled DAJP1 through e.g. DAJP3 (generically DAJPi), and denoted 510 through 530 (5i0, generically);
2. At an Administrator level, a storage of data 610, labeled LJPk (from Lookup JNDI Provider), and referencing the DAJPs to be accessed to form an application JNDI provider; the notation LJPk generically refers a k-th LJP, also generically denoted 6k0;

3. At the level of a client x, a Lookup service LKUP, using the LJPk to access the DAJPi. The lookup service will also be denoted generically 7x0.

The storage of data at the administrator (or server) level may also be based on JNDI providers, termed Lookup JNDI Providers.

FIG. 10 shows again e.g. three Deployed Application JNDI Providers 510 through 530. A DAJP, dajp1, may include objects to be used to interface applications from vendor1; two other DAJPs, dajp2,dajp3, do the same for vendor2,vendor3, respectively.

A first Lookup JNDI Provider 610, or ljp1, references the DAJPs to be used in an application App1, for example dajp1 and dajp2, which will serve for lookups from client1 or 710 and client2 or 720. For another application App2, one may decide to use application components from vendor2 and vendor3. Another Lookup JNDI Provider ljp2 or 620 may be used for that purpose, and will serve e.g. for lookups from client3 or 730 and client4 or 740.

In other words, embodiments of the present invention may use a mapping between the representations as used by the component providers and a representation, which may be arranged as a tree, and may use expressions having the form <attName>=<attValue>, or, more generally couples (<attName>,<attValue>), since the "=" sign may be implicit. In other words, each nexus may be associated with one or more pairs having a form like
<attName>=<attValue>
for example: version =v1.0

This name+value notation exists per se in the 3GPP Naming convention. The leaf node contents may be a value only; they may also be defined using the name+value notation, if desired.

Using such naming scheme offers several advantages:
there is no need for providing a separate description of the tree: the tree description can be discovered at run-time.
the tree may include various branches with different naming policies, without risks of confusion.
there is no need for a context/subcontext/object relative name to be necessarily associated to a single attribute. As shown in FIG. 6, a single nexus box may contain e.g. two pairs of data having the form: <attName>=<attValue>.

The lower right portion of FIG. 5 shows another leaf node N112 for EvtTopic, which corresponds to the item list shown at E2-5. Node N112 for EvtTopic is associated with the Distinguished Name shown at E2-6, and with several Relative Distinguished Names, e.g. the one shown at E2-7.

Node N112 will illustrate another feature of this invention: a client looking for an interaction object should not have to know whether this interaction object is exactly at the specific level he is looking at, or if it is an interaction object common to several specific levels. In FIG. 5, TTSystemHome is specific to the Product1 v1.0 product. Assume that several products, including Product1 v1.0, will use the same interaction object, e.g. EvtTopic, for a given functionality. The Deployer might duplicate this shared object in the tree at each specific product level where it will be used; alternatively, he may prefer to bind EvtTopic more broadly to the ApiType and vendor attributes, as shown in FIG. 5.

Then, if a client makes a search of the type "find the topic for product Product1 v1.0", the search mechanism will look for a specific object at the level pointed by the given attributes, then step back upwards in the tree until finding a generic object matching the search criteria.

The embodiment of FIG. 5 will now be described in more detail with reference to FIG. 11, while showing also the sequence of operations. The object names are purely exemplary.

Each Deployed Application JNDI Provider (DAJPi) has a tree e.g. 510. The Deployer creates and binds a shared object 511, having a predefined name, e.g. accessor, and having a set of public methods, having themselves predefined names, to inspect that tree 510. That accessor object may be an Enterprise Java Bean implementing an interface whose interface class contains such public methods (the JndiProviderAccessor interface). The methods provide access to the DAJPi, taking advantage of the underlying JNDI implementation (i.e. to know attributes supported for searches, to retrieve objects, etc.). Thus, each DAJPi binds the interaction elements of a deployed application into a DAJP tree (also a JNDI tree). Typically, there is one DAJP per application deployment. In fact, the shared object 511 is a convenient way to attach the set of methods to the DAJPi; other ways of attaching the methods to the DAJPi may be used as well.

The Administrator binds a Handler Home object 619 having a chosen JNDI name, e.g. JndiProviderHandlerHome, into each Lookup JNDI Provider LJPk, e.g. 610. That handler home object 619 may host one or more individual handler objects like 611 and 612 (e.g. JndiProviderHandlerBeans) and, in fact, may include methods to create and maintain such objects (and also remove them, if desired). The function of a JndiProviderHandlerBean is to access the accessor put in an associated DAJP. Typically, one JndiProviderHandlerBean, e.g. 611, is associated to a given DAJPi, e.g. 510, to a given Context in that DAJPi, also to the JndiProviderAccessor e.g. 511 being present at that context. A JndiProviderHandlerBean may be an Enterprise Java Bean, more specifically an entity bean, if persistence is desired.

Before being able to make a lookup, the client retrieves the LookupHome interface 719 bound in its own Lookup JNDI Provider LJPk or 610. He then creates a LookupBean Session Bean 711. A Lookup Remote interface is returned. The LookupBean retrieves the local JndiProviderHandlerHome, e.g. 612.

To make any operation on administrative domains (to be defined hereinafter), the client uses the Lookup Remote interface. A call to it with a domain name will be delegated to the JndiProviderHandlerBeans associated to the DAJPs being in that domain. Then each JndiProviderHandlerBean will delegate the processing of the operation to the associated JndiProviderAccessor, thereby gaining in efficiency and supporting distribution.

Figure 11:
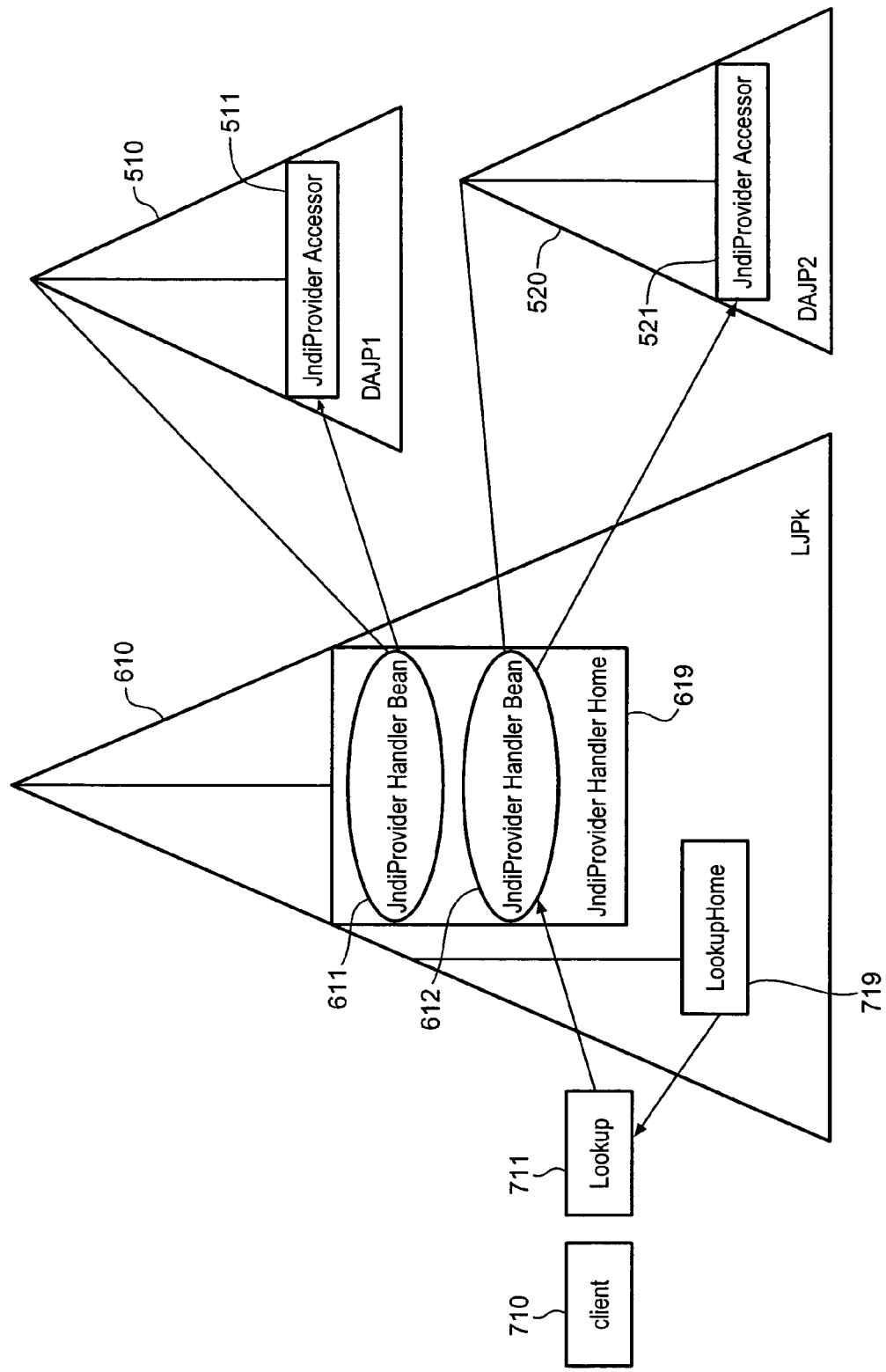
FIG. 11 illustrates an embodiment of the exemplary system of FIG. 9.

In FIG. 11, the triangle 510 represents the DAJP tree (not the whole JNDI tree). The line from 511 to the apex of 510 shows that JndiProviderAccessor 511 is bound to the initial context of DAJP 510. The line from JndiProviderHandlerBean 611 to the apex of 510 reflects the fact that JndiProviderHandlerBean 611 will inspect the predetermined location in 510, to find JndiProviderAccessor 511. Finally, the line from JndiProviderHandlerBean 611 to JndiProviderAccessor 511 reflects the relationship now established between JndiProviderHandlerBean 611 and JndiProviderAccessor 511.

A more detailed exemplary embodiment of above stage 1. will now be described with reference to Exhibit E3-1.

The Deployer will firstly create an object having a predefined name, e.g. Accessor. He will bind that Accessor object at a predefined location of the DAJP tree or sub-tree, i.e. directly into an exposed InitialContext. The predefined location may be the root of the tree. In fact, the Accessor object may be located in the DAJP itself, or besides it. The Accessor object may be an Enterprise Java Bean (EJB), that may be easily retrieved from an EJB access code. However, other types of shared objects may be used as well.

The purpose of the Accessor object is to host a set of public methods of predefined names and functions, e.g. exemplified as M1 trough M5 in E3-1. The Accessor object may implement e.g. the JndiProviderAccessor interface defined in E3-1. The Accessor object forms a representation of knowledge it has on the underlying JNDI implementation, through its members and methods. The implementation of the Accessor will always have the same generic common Accessor interface, whatever the JNDI implementation is (e.g. "basic", "directory", or LDAP).

As known, methods are declared in an interface. The methods enunciated in the JndiProviderAccessor interface will need a concrete implementation, which may depend upon the underlying JNDI implementation.

The case of a "basic" JNDI implementation is now considered. A utility class named e.g. JndiProviderAccessorImpl, may be used for concretely implementing the methods of the JndiProviderAccessor interface in this case. The utility class JndiProviderAccessorImpl comprises definitions for:
 a domain name, and
 the environment necessary to connect to a DAJP.

Thus, when building a particular system, and for a given DAJPi, the Deployer will create an Accessor object implementing the JndiProviderAccessor interface, which may be in the form of an instance of the class JndiProviderAccessorImpl, with:
 a particular domain name, and
 a particular definition of the environment necessary to connect to the DAJP, implemented using a simple basic JNDI provider.

As noted, the support of attributes in inspecting the JNDI tree may be "simulated", using the tree hierarchy. A corresponding embodiment will now be proposed.

When created, the Accessor object may scan the JNDI tree, and create internal memory cache(s), containing information in the form shown in E2-8 and E2-9 (in the case of the simplified tree of FIG. 5).

The data shown in E2-8 may conveniently be represented e.g. in the form of a bi-dimensional array. Another 2-D array may be used for the data shown in E2-9. Other representations may be used, e.g. a multi-dimensional array may contain both the name data of E2-8 and the value data of E2-9. The arrays may be dynamically constructed.

Now, the accessor methods may operate as follows:
 method M1 reads the domain name (set by the provider when creating the object), or another domain identification, in the accessor object;
 method M2 reads the left column of E2-8, thus retrieving the names of attributes supported for searching;
 method M3 reads the left column of E2-9, thus retrieving the values existing in the tree for the attributes, or for a given attribute, using the right column as an index;
 method M4 can retrieve an object using its full JNDI name, by direct access in the tree; alternatively, E2-8 and/or E2-9 may also be used;
 method M5 serves to retrieve one or more objects using one or more attribute values, using indexing and/or filtering techniques:
 considering for example attribute values "Vendor1" (N11) and "Product1" (N111), these are compatible (one, N111, contains the other, N11), and lead to the leaf node "TTSystemHome", a Home Interface (N11111 is the single longest string including N111);
 considering now attribute values "TroubleTicket" (N1) and "Vendor1" (N11), these are compatible (N11 contains N1), and now lead to two leaf nodes, again "TTSystemHome" as a Home Interface, and also "EvtTopic", as a Topic (the explanations based on the "N*" notation are purely illustrative).

Thus, lookups may thereafter be done using the caches to find the name(s); then only direct JNDI lookups (with no walk through the tree) will be performed to retrieve the objects. This avoids the need for walking through the tree at each lookup.

The DAJP tree may be prepared by the Deployer, from information given by the product's vendor. Care should be taken to avoid mixing user data along with system data in the tree. With a view to optimize access to his tree, the Deployer should exclude therefrom any objects which are not relevant to the access to the server application; otherwise, the lookup/accessor would have to scan unuseful contexts and would find unuseful data. In fact, the Deployer may simply structure the tree so as to separate:
 parts of the tree being relevant for the system, and
 parts of the tree concerning e.g. user data, being not relevant for the system.

It may not be necessary to fill-in the cache with a full description of the tree seen by the Accessor object; the cache may only contain a portion of the tree description, as required to speed-up the future client lookups. Environment data created when creating the Accessor may identify the parts of the tree that have to be scanned.

The above described mechanism is a simple, efficient and memory-saving way of implementing the JndiProviderAccessor interface, applicable to all JNDI versions of the JNDI, from the basic one, which only supports direct access to the JNDI tree.

Alternative designs of the JndiProviderAccessor interface may be developed for use with more powerful JNDI implementations. Considering e.g. an LDAP implementation, a corresponding JndiProviderAccessor interface would simply have to use the "search by attribute" facility of LDAP. In this case:
 the hierarchy of the tree does not matter: in fact, it can be any hierarchy, even none (everything being put at the same initial level). What only matters are the natures of the attributes associated to each object.
 the Deployer has to associate to each object all attribute values he wants to expose to retrieve it. Following the example above, the TTSystemHome object might be bound with the following attribute list: version=v1.0, product=Product1

In an embodiment of the present invention, the name of the domain may be stored in an object into the DAJP itself. Thus, there is one domain per DAJP, and one JndiProviderHandlerBean per DAJP. However, other combinations may be used as well. Generally, a set of deployed application JNDI providers may be grouped as an administrative domain, or more briefly a "domain".

Since the domain information existing in each Accessor is exposed by the Lookup JNDI Provider(s), the client wanting to retrieve an interaction object need only be aware of the domain name. It does not have to be aware of the hierarchy of the DAJP where the object is located, not even of the DAJP itself.

The client does not have to know the "specificity" of the interaction object he wants to retrieve:

1. If an object has been bound for the given specific search criteria (i.e. set of attribute values), this object is returned.
2. Else the Lookup may retrieve the shared object bound with a search criteria as close as possible to the given criteria, but with no contrary value.

Thus, a Deployer may decide that all the applications of a given vendor he will provide will share a given object (for example the topic to which all events will be sent). In such a case, there is no need for the Deployer of the DAJP to bind the same interaction object several times into the tree, in association with each version of each product. He can bind the object just once associated to the vendor.

In a simple DAJP with attributes simulated using the hierarchy, this would be as shown in FIG. 5. The EvtTopic object N112 corresponds to the item list:

root=MyRoot, apiType=TroubleTicket, vendor=Vendor1, name=EvtTopic.

The client can specify that he wants to retrieve the event topic for Product1 v1.0 product, using e.g. the search attributes:
version=v1.0, product=Product1

There is in fact no specific Topic for Product1, being v1.0 or whatever; in this case, the EvtTopic shared by all the ISV products shall be returned.

With the above notation, N111 and N1111 are compatible; the longest N1111 will be "eroded" into N111, then N11, which is directly connected to leaf node N112.

For the EvtTopic interaction object, no value has been provided for the "product" attribute. In a default embodiment of the search algorithm ("exact" search), the above "erosion" is not made, and an EvtTopic object bound with the attribute value "product=MyProduct" shall not be returned, as it is not an object shared among all products (different value used for "product" attribute). Alternatively, it might be returned as well ("near" search), using the above "erosion" process, while appropriately reporting the missing condition, if desired.

By defining Accessor implementations for the various ISV applications, the Deployer provides a well-defined way to retrieve the name of the domain in which the DAJP is, then to retrieve names and values of attributes supported in the tree, and finally to retrieve object(s) associated to some attribute values or to a JNDI name, since the Accessor interface may contain the methods for this.

After describing the Deployer, the server (Administrator level) will now be considered, with reference to Exhibit section E3-2.

As noted, the server comprises stored data selectively representing the DAJPs. In the embodiment, the stored data are arranged as one or more Lookup JNDI Provider(s) or LJP. A Lookup JNDI Provider is a JNDI provider that contains references to DAJPs.

Generally, the Administrator will specify which DAJPs are available for the client. This is done through creating one Entity Bean, JndiProviderHandlerBean, per DAJP available for access. The primary key is the URL of the DAJP. Using an Entity Bean to represent/access a DAJP is an exemplary way to make persistent the information (the context environment properties) provided by the Administrator to gain access to that DAJP.

Firstly, the Administrator will bind a JndiProviderHandlerHome Home interface into the Lookup JNDI Provider (LJP). This binding may be performed using the Deployment Descriptor, or using a manual binding operation. Then at deployment stage, the link is done.

The Administrator then creates one JndiProviderHandlerBean per DAJP, as indicated. This is done using one of the create( ) methods of the JndiProviderHandlerHome.

The create0( ) method is a very simple one, just taking the URL of the DAJP as parameter (null URL to reference the local JNDI provider as a DAJP). The EJB will create an InitialContext using the default InitialContextFactory used by the DAJP implementation, to browse the connected DAJP.

The create1( ) method is a more complete one, taking as parameter the whole JNDI environment (allowing to define URL, security, etc.) to create a context on the DAJP. One of the environment properties may be the name of an applet that can be used to provide additional missing properties. So as to ease the administrator's life, it is possible to:
a) Define a Graphical User Interface using an applet, with fields being the environment properties,
b) Make a simple call JndiProviderHandlerHome.create1( ) passing only in the environment the name of the applet,
c) Specify the whole environment using the User Interface.

The JNDI properties may also be obtained from a resource file in which they are specified.

Concerning Administration in general, the set of DAJPs available for one or several clients is specified in the Lookup JNDI Provider: the JndiProviderHandlerBean EJBs will reside in a JndiProviderHandlerHome being in the Lookup JNDI Provider. The Administrator binds the JndiProviderHandlerHome Home interface into the Lookup JNDI Provider. He will then create one JndiProviderHandlerBean per authorized DAJP, as shown in FIG. 11.

In an embodiment, the DAJP may be based on a JNDI implementation supporting the JNDI Event package; this would allow to have an event being sent when the tree is updated. The JndiProviderAccessor may listen to such events and take appropriate actions, corresponding to the tree update. Thus, the fact that a DAJP is updated at run-time (i.e. some objects are added, removed, etc.) does not impact the associated EJB (JndiProviderHandlerBean) handled by the Administrator, but only the JndiProviderAccessor of the DAJP to which the work is delegated.

Also, direct access to the JndiProviderHandlerHome Home interface is reserved to the Administrator.

The operation of the Client will now be described, with reference to Exhibit section E3-3.

At the client level, the Lookup services (LKUP) offer two types of tasks to the client applications:
ask for the attributes being supported in a given domain; the return comprises names of attributes and their existing values;
ask to retrieve interaction objects, using a full JNDI name, or attributes and attribute values.

The client uses the Lookup service to access to the domains, as exposed by the Administrator in the Lookup JNDI Provider.

The Lookup service may be based on the "Session Bean" variety of the EJBs. This enables an available DAJP to be accessible from several different places in a client application.

Thus, the Lookup service comprises a Session Bean, LookupBean, which supports the main operations of the lookup service. Its detailed construction may be as follows:
1. A LookupHome interface is bound into the Lookup JNDI Provider. This can be done using a Deployment Descriptor or manually.

1.a. If the client is an EJB, it is able to reference the LookupBean in its Deployment Descriptor, so the LookupHome interface can be located anywhere in the Lookup JNDI Provider.
1.b. If the client is not an EJB, it has to know where the LookupHome object is located to pick it. In this case, the LookupHome object may be bound e.g. directly at the InitialContext of the Lookup JNDI Provider, with a predefined name, e.g. "LookupHome".
2. For retrieving an object from the domains made available by the Administrator, a client application will include a piece of the client code, which will:
  2.a. Retrieve the LookupHome interface
  2.b. Create a LookupBean Session Bean
  2.c. Use a returned Lookup Remote interface to make the search.

The LookupBean will directly interact with the Lookup JNDI Provider to retrieve the JndiProviderHandlerHome object put in there by the Administrator. Thus, there is no need to bind the JndiProviderHandlerHome interface at a well known place: the LookupBean Deployment Descriptor will identify it as an EJB reference, and the real location of the Home interface is specified at deployment time.

In an embodiment of the present invention, the return of a lookup is a set of objects, e.g. a "NamingEnumeration". This accommodates the fact that several objects matching the attribute values of a search may exist, if the search criteria are not narrowed enough.

Although the return might be directly the set of objects associated to the attribute values, what is returned is preferably given a more extended structure, i.e. a set of instances of an interface class, LookupResult, with LookupResultImpl being an exemplary implementation of LookupResult.

Each LookupResult instance provides the following data:
the object to be returned:
  it is returned as an Object, so has to be downcasted to EJBHome, Topic, etc. depending on the search (the narrowing is done when creating the LookupResult instance)
the set of Attribute objects
  This may be an "Attributes object" (a plural structure) returning all the attribute values associated to the object. This may be optional if the lookup is based on an "exact" search, fully matching the input attribute values.
the JNDI Name associated to the object
  This may be optional; the purpose is that possible future access to the object could be done in a faster and more direct way.

A simple example will now be proposed.

EXAMPLE 1

This example considers the simple case, where an ISV product Prod1 has an system driver running with a "basic" JNDI implementation. It comes with a DAJP dajp1.

The Deployer may use the JndiProviderAccessorImpl class. In the initialisation phase of the driver, he can create a JndiProviderAccessorImpl object and bind it into the local DAJP. It is now assumed that the whole tree has to be exposed, so that the default environment provided by the "basic" JNDI implementation is fine. An example of a corresponding Java code structure is shown in E4-1.

Now considering the Administrator, there is an application App1 using the above mentioned system interface.

The Administrator decides that this application has to interface with the product Prod1. So it has to authorize App1 to access the DAJP of Prod1. Such information may be specified before the execution of any client. Then:

First, a JndiProviderHandlerHome Home interface has to be bound into the Lookup JNDI Provider of App1. The Administrator specifies the info into the Deployment Descriptor: the JndiProviderHandlerBean is an Entity Bean listed in the DD, also listed as an EJB reference in the part of the DD relative to the EJB that the Administrator will use to reference the DAJPs, i.e. to create the JndiProviderHandlerBeans. The link with the real location is specified at deployment time.

(ii) then in the initialization, the Administrator has to reference the DAJP of Prod1. This is done by creating a JndiProviderHandlerBean into the Home.

It is now assumed there are several environment properties to be specified. An Applet has been specified to allow the Administrator to specify those properties using a User Interface.

An example of a corresponding Java code structure is shown in E4-2

Finally, Client1 wants to interface Prod1. It will have to use the Lookup service of App1 for that.

As described in the Deployment Descriptor, the LookupBean Session Bean includes in its Deployment Descriptor part the EJB reference to the JndiProviderHandlerBean. The link with the real location of this Entity Bean Home is done at deployment time.

The LookupBean itself is also listed as an EJB reference in the Deployment Descriptor part relative to the client EJB that will perform the lookups.

An example of a corresponding Java code structure is shown in E4-3.

This invention may also be viewed as proposing a mapping between:
  a containment tree, where each node (nexus or leaf) is associated with an object name and each node is contained in (i.e. is below) another node (each object is not necessarily bound to a leaf node); and
  a tree hierarchical "value" tree, e.g. a JNDI tree, where each interaction object is a leaf node, while nexus are values of that object, with the names of the attributes being defined in the "mapped" containment tree.

The containment tree may further be arranged to allow to name each interaction object uniquely in a global Naming space. This may be obtained e.g. by using the 3GPP common naming schema (or an equivalent alternative thereto).

An embodiment of the present invention offers one or more of the following:

1. at the time a client application is developed and even deployed, the interaction objects to be accessed are not necessarily fully well known, so as to be directly accessible in the client code (or even in its Deployment Descriptor); in other words, the interaction objects and their attributes are often unavailable, or even undefined at that time;
2. making the tree definition available would necessitate to specify a naming policy used in the tree, so as to allow a search mechanism to know where to look in the tree to try and match a given attribute value; however, several branches in the tree may obey different naming policies;
3. furthermore, the naming policies should be kept in synchronization with the tree, e.g. where a "plugability" is desired, i.e. a client application should be able to start to run anyone of various ISV applications, functionally similar, however having different interaction objects and different attributes for each of these objects.

One embodiment of the present invention may be used as follows:

A. Deployer

The DAJP Deployer will:
A1. use the JndiProviderAccessorImpl class(for DAJPs working with "basic" JNDI), or another class implementing the JndiProviderAccessor interface,
A2. Create an instance of that class,
A3. Bind it into the DAJP at the InitialContext level, with a defined name (e.g. "accessor"), as there will be a single accessor per DAJP.

B. Administrator

The Administrator will:
B1. in each Lookup JNDI Provider, bind a JndiProviderHandlerHome object (possibly by simply specifying an entry in the Deployment Descriptor). To the extent it will be accessed only by other EJBs, this object does not have to be bound at a special well known place. So its real location can be defined in the referencing EJB Deployment Descriptor at deployment time.
B2. create one JndiProviderHandlerBean per DAJP. This may be done by simply providing the URL of the DAJP, or by using an applet enabling the Administrator to define a User Interface, which specifies the different properties to connect to the DAJP.

As it will be seen, accessing the DAJPs through the JNDI server enables the client to access an item, e.g. the above TTSystemHome, without having to be aware of the hierarchy existing in the ISV application JNDI DAJP providers he is looking at. The client needs only to be focused on the "business" attributes associated to the element. The client will nevertheless be able to look for an interaction element in an ISV application, using some of the attributes "associated" to the interaction element by the Deployer of the ISV application, using the JNDI provider (the sub-tree) in which the interaction element has been bound.

Thus, an Administrator may, for each deployed application to be interfaced by client application software, identify and reference a corresponding JNDI DAJP provider, where the interaction elements are defined prior to the client software execution. In other words, the interaction elements exposed to be used by a client software are registered in the JNDI provider deployed for the application. As noted, the representation itself may have the form of a JNDI tree, or may be converted into that form, or into a similar one.

Figure 10:
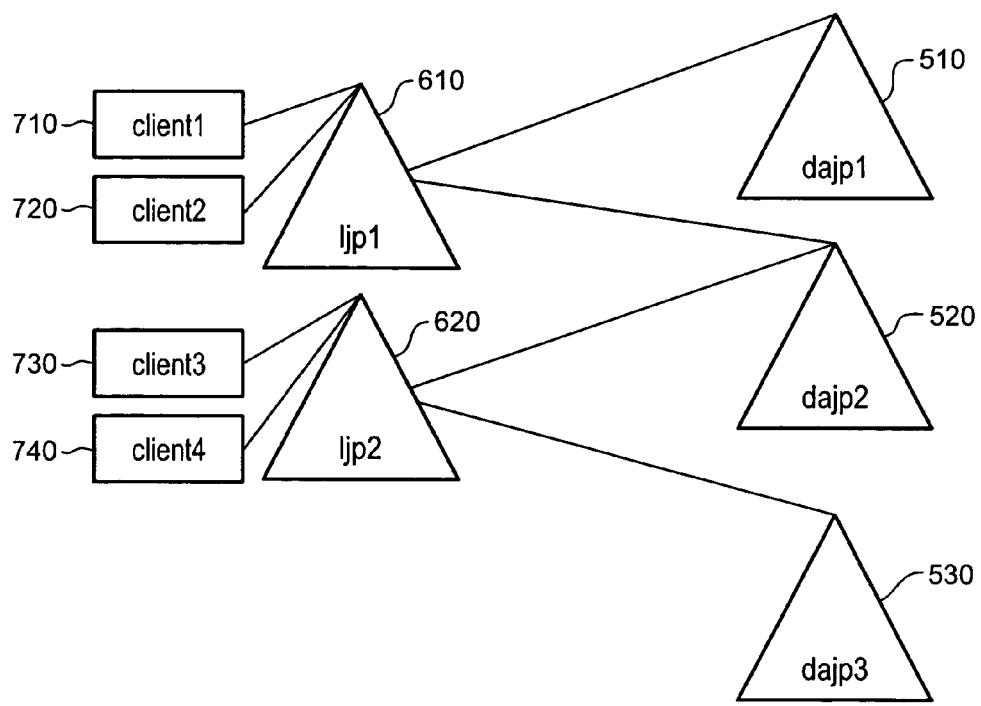
FIG. 10 illustrates another embodiment of the exemplary system of FIG. 9 in accordance with an embodiment of the present invention.

The above described model also enables plugability in accordance with an embodiment of the present invention. FIG. 10 may be associated with a schema as follows:

dajp<i> is the DAJP for objects relative to application(s). So it will host Homes, Topics, Queues, etc. In an embodiment of this invention, it includes a JndiProviderAccessor, for access to the objects. This accessor will have been put there by the Provider or Deployer.

2. ljp<k> is the Lookup JNDI Provider for certain clients, including all the objects those clients will have to use to gain access to the relevant application. In an embodiment of this invention, it includes a JndiProviderHandlerHome, in turn having one JndiProviderHandlerBean per DAJP dajp<i>. Those Enterprise Java Beans will have been put there by the Administrator.

3. client<x> is a client using an ljp<k>.

Various other features and advantages of this invention will now be considered.

In accordance with this invention, the support of attributes may be simulated by using a hierarchy where the different context/subcontext names are handled as attribute values. Since attribute values are represented as context names, an internal cache may be created at "administration" time, to speed-up all client access to the unique context names. This enables the fast retrieval of an object, in the presence of an application server which supports a simple JNDI implementation only.

The Administrator (who may be the same person as the DAJP Deployer) is in charge of referencing the DAJPs to which a given application is authorized to access. Referencing the DAJPs to be accessed is defining the set of deployed applications this given application can interface (from one or more clients). The Administrator provides all the DAJP references as objects into the Lookup JNDI provider (LJP). Actually, the Lookup JNDI Providers (or at least some of them) may be incorporated into an extended tree which also comprises some or all of the DAJPs, and possibly other information, as already explained.

By using the above described system, the client may retrieve objects in domains authorized by the Administrator, using attribute values associated to those objects. More precisely, the client may:
1. Know what are the domains he can working with (i.e. authorized by the Administrator);
2. Know what are the names of the attributes associated to objects in a given domain;
3. Know what are the possible values for a given attribute in a given domain (i.e. attribute values associated to contexts/subcontexts or objects in the DAJPs in the domain);
4. Retrieve the object(s) associated to attribute value(s) in a given domain;
5. Retrieve an object using its full JNDI name in a given domain.

By having a DAJP represented as an EJB, the following advantages may be obtained:
Persistence: the administration work can be saved simply using Entity Bean persistence.
J2EE services: transaction, security, etc.
the J2EE paradigm is respected: elements are hosted in a Home.

Having the Lookup represented as a Session Bean offers the following advantages:
1. Remotability: the client can be remote, it retrieves the Lookup Remote interface which includes handling of remotability, thus enabling e.g. RMI communication;
2. J2EE services: transaction, security, etc.
3. elements presented to a client are represented as Session Beans.

On another hand, an embodiment of the present invention offers a clear distinction between "presentation" and "data":
the data are identified by the Administrator and kept into the JndiProviderHandlerHome,
the presentation is linked to the data in the sense that a LookupBean will interact with the JndiProviderHandlerHome located in the Lookup JNDI Provider, where it is itself located. But it is separated from it, as it lets the data exposed themselves (it asks the JndiProviderHandlerHome to know the EJBs it contains; then, in turn, each JndiProviderHandlerBean EJB is itself a presentation of the data located in the corresponding DAJP).

The above described model is also fully appropriated for the dynamicity of a network, since the LJPs control what is visible to the clients: if a new application has to be used, it may come with its DAJP (with a JndiProviderAccessor bound into it). The Administrator can at run-time add a new JndiProviderHandlerBean into the Home of the Lookup JNDI Provider of the application(s) authorized to use this new DAJP.

If an ISV application has to be removed, the Administrator can at run-time remove the corresponding JndiProviderHandlerBean from the Homes of the impacted application(s).

Access can even be restricted at run-time by having the Administrator adding/removing JndiProviderHandlerBeans in Lookup JNDI Provider(s).

The above exemplary description may be subject to many modifications without departing from the scope of this invention.

The DAJP Deployer is generally intended to bind interaction objects into a given DAJP. Although the 3GPP naming scheme is interesting for that purpose, other unique naming scheme may be used as well, with the implementation being be changed and/or extended accordingly.

In the above description, the JndiProviderAccessor as a simple (interface) object, so that there is a single such object per DAJP. Alternatively, each DAJP might be provided with a Home interface for creating and containing one or more JndiProviderAccessor accessor object and/or the methods it defines.

As used, the JNDI implementation should preferably support the JNDI Event package. Thus when a DAJP using it is updated at run-time, an event will be created, and used to inform the current JndiProviderHandlerImpl implementation, so that its internal cache(s) may be updated. In other words, where there is a need for runtime updates of a DAJP, this invention preferably uses a JNDI implementation using the JNDI Event package; the provided JndiProviderAccessor implementation is extended to refresh internal caches when receiving events.

Most of the detailed description refers to a client-server distributed system. However, this invention may also apply to distributed computer systems using an interaction model other than the client-server model, or between various processes co-existing in a single computer station.

Embodiment of the present invention may also provide the code itself, especially when made available on any appropriate computer-readable medium. The expression "computer-readable medium" includes a storage medium such as magnetic or optic, as well as a transmission medium such as a digital or analog signal.

The software code basically includes separately or together, the codes for use at the Deployer level, at the Administrator level, and a the client level, as well as precursors and/or generators of such codes, e.g. written in IDL. The invention also encompasses the combinations of such codes with language dependent and/or hardware dependent code and/or data.

What is claimed is:

1. A method of aiding deployment in a distributed computer system, using application software components, comprising:
(a) providing a tree representation of objects existing in at least one of the application software components, the tree representation including an object as a leaf node, with at least one attribute of the object being in nexus between the root and the leaf node, wherein the tree representation is mapped to a containment tree that defines names of the attributes in the tree representation, and
(b) providing an accessor object, comprising accessor methods to the tree representation, said accessor methods having predefined names and functions.

2. The method of claim 1, wherein: stage (a) comprises providing a tree representation in which at least one of the tree nexus comprises data defining both an attribute name and an attribute value.

3. The method of claim 2, wherein stage (b) comprises: (b1) converting the tree representation into at least one set of data (E2-8; E2-9) connecting an attribute with a corresponding location in the tree, and (b2) storing at least one set of data or a designation thereof in the accessor object.

4. The method of claim 3, wherein stage (b1) comprises converting the tree representation into a set of data connecting an attribute name with a corresponding location in the tree.

5. The method of claim 3, wherein stage (b1) comprises converting the tree representation into a set of data connecting an attribute value with a corresponding location in the tree.

6. The method of claim 4, wherein stage (b1) comprises converting the tree representation into a set of data connecting an attribute value with a corresponding location in the tree.

7. The method as claimed in claim 1, wherein the attributes are arranged in the tree in accordance with a predefined order.

8. The method as claimed in claim 1, wherein stage (b) comprises providing a plurality of accessor objects, with each accessor object comprising a domain identification, being readable through at least one of the accessor methods.

9. The method of claim 8, wherein at least two of the accessor objects access different sub-trees in the tree representation.

10. The method as claimed in claim 8, further comprising the step of: (c) providing one or more handler objects, each accessing at least one of the accessor objects.

11. The method of claim 10, wherein stage (c) comprises:
(c1) configuring the handler objects to access accessor objects corresponding to application software components being currently in service in the distributed computer system.

12. The method of claim 11, wherein stage (c1) uses attributes of the application software components.

13. The method of claim 10, further comprising the stage of: (d) in at least one client software application, providing a lookup service, adapted to communicate with at least one handler object.

14. The method as claimed in claim 1, wherein said accessor methods of stage (b) comprise a method to retrieve supported attribute names.

15. The method as claimed in claim 1, wherein said accessor methods of stage (b) comprise a method for exact search in the tree representation.

16. The method as claimed in claim 1, wherein said accessor methods of stage (b) comprise a method for near search in the tree representation.

17. The method as claimed in claim 1, wherein said accessor methods of stage (b) comprise a method capable of navigating up in the tree to find a leaf node.

18. An article of manufacture for reorganizing data in an original log file, the article comprising:
data defining a tree representation (510) of objects existing in at least one application software component, the tree representation including an object as a leaf node, with the attributes of the object being in nexus between the root and the leaf node, wherein the tree representation is mapped to a containment tree that defines names of the attributes in the tree representation, and first tree access code (511) attaching accessor methods to the tree representation, said accessor methods having predefined names and functions.

19. The article of claim 18, wherein said first tree access code comprises an accessor object, comprising the accessor methods.

20. The article of claim 19, wherein the accessor object has a predefined name.

21. The article of claim 18 further comprising: a second tree access code, adapted to access the first tree access code.

22. The article of claim 21, wherein said second tree access code comprises a handler object.

23. The article of claim 21 further comprising: a third code for incorporation in at least one client software application, said third code providing a lookup service, adapted to communicate with the second tree access code.

* * * * *